(12) United States Patent
Fox

(10) Patent No.: US 10,957,919 B2
(45) Date of Patent: Mar. 23, 2021

(54) SYSTEM AND METHOD FOR HEAT EXCHANGE BETWEEN GASEOUS FUEL TANK AND HEAT TRANSFER MEDIUM

(71) Applicant: Toyota Motor Engineering & Manufacturing North America, Inc., Plano, TX (US)

(72) Inventor: Dallas K. Fox, La Habra, CA (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 119 days.

(21) Appl. No.: 16/151,255

(22) Filed: Oct. 3, 2018

(65) Prior Publication Data

US 2020/0112037 A1    Apr. 9, 2020

(51) Int. Cl.
*H01M 8/04029* (2016.01)
*H01M 8/04701* (2016.01)
*H01M 8/04746* (2016.01)
*H01M 8/04791* (2016.01)

(52) U.S. Cl.
CPC ... *H01M 8/04029* (2013.01); *H01M 8/04708* (2013.01); *H01M 8/04768* (2013.01); *H01M 8/04813* (2013.01)

(58) Field of Classification Search
CPC combination set(s) only.
See application file for complete search history.

(56) References Cited

U.S. PATENT DOCUMENTS

| | | | |
|---|---|---|---|
| 4,910,968 A * | 3/1990 | Yamashita | F25B 49/025 62/204 |
| 5,161,739 A * | 11/1992 | Saito | F24D 7/00 237/67 |
| 5,251,603 A | 10/1993 | Watanabe et al. | |
| 7,266,975 B2 * | 9/2007 | Hupkes | F25J 1/0022 62/612 |
| 7,418,782 B2 | 9/2008 | Kimbara et al. | |
| 7,938,150 B2 | 5/2011 | Handa | |
| 8,528,774 B2 | 9/2013 | Jorgensen | |
| 8,917,809 B2 | 12/2014 | Nozawa | |
| 9,004,045 B2 | 4/2015 | Seydell et al. | |
| 9,493,051 B2 | 11/2016 | Bills et al. | |
| 9,586,806 B2 | 3/2017 | Mathison | |

(Continued)

FOREIGN PATENT DOCUMENTS

| JP | 2548269 | 5/1997 |
|---|---|---|
| JP | 2003246400 | 9/2003 |
| JP | 2012116270 | 6/2012 |

*Primary Examiner* — Kaity V Chandler
(74) *Attorney, Agent, or Firm* — Snell & Wilmer LLP

(57) ABSTRACT

Methods, systems, and apparatus for an active fuel cooling system ("fuel cooling system"). The fuel cooling system includes a fuel tank configured to store fuel. The fuel cooling system includes one or more pipes positioned adjacent to, in contact with, or within the fuel tank that are configured to deliver refrigerant that cools the fuel tank. The fuel cooling system includes a compressor for pumping the refrigerant through the one or more pipes to cool the fuel stored within the fuel tank. The fuel cooling system includes an electronic control unit connected to the compressor and configured to operate the compressor to pump the refrigerant through the one or more pipes to cool the fuel stored in the fuel tank.

20 Claims, 6 Drawing Sheets

(56) References Cited

U.S. PATENT DOCUMENTS

| | | | |
|---|---|---|---|
| 9,834,089 B2 | 12/2017 | Aso | |
| 2002/0088240 A1* | 7/2002 | Shi | B60H 1/3205 |
| | | | 62/180 |
| 2008/0145714 A1* | 6/2008 | Kagami | H01M 8/04395 |
| | | | 429/413 |
| 2008/0289591 A1 | 11/2008 | Tessier et al. | |
| 2009/0035613 A1* | 2/2009 | Chikugo | H01M 8/04029 |
| | | | 429/430 |
| 2010/0323261 A1* | 12/2010 | Igarashi | H01M 8/04335 |
| | | | 429/436 |
| 2012/0111447 A1* | 5/2012 | Mori | F17C 3/025 |
| | | | 141/4 |
| 2013/0014854 A1* | 1/2013 | Mori | B67D 7/348 |
| | | | 141/1 |
| 2015/0024291 A1* | 1/2015 | Ito | H01M 2/345 |
| | | | 429/405 |
| 2017/0130901 A1 | 5/2017 | Sloan et al. | |
| 2017/0241324 A1* | 8/2017 | Liu | F02N 19/10 |
| 2017/0335748 A1* | 11/2017 | Zhang | F01N 3/30 |
| 2018/0038550 A1 | 2/2018 | Kondo | |
| 2019/0006686 A1* | 1/2019 | Carralero | H01M 8/04201 |
| 2019/0086031 A1* | 3/2019 | Fujisawa | B60K 15/067 |
| 2019/0186440 A1* | 6/2019 | Perfetto | F02M 37/20 |

\* cited by examiner

SYSTEM AND METHOD FOR HEAT EXCHANGE BETWEEN GASEOUS FUEL TANK AND HEAT TRANSFER MEDIUM

BACKGROUND

Field

This specification relates to actively and automatically managing and controlling heat exchange within a fuel tank to cool fuel within the fuel tank.

Description of the Related Art

Fuel cell vehicles use hydrogen to power an electric motor to run a vehicle. Unlike conventional vehicles, which run on gas or diesel, fuel cell vehicles combine hydrogen and oxygen to produce electricity to run a motor. When fueling a hydrogen-powered electric vehicle, the hydrogen gas exhibits a negative Joule-Thomson effect. That is, the hydrogen gas increases in temperature or "heats up" when the hydrogen gas expands. When the hydrogen gas exits the fuel supply hose into the vehicle, the hydrogen gas undergoes an expansion because the pressure in the hose is higher than the pressure in the tank, initially. This causes the fuel tank to heat up. Currently, various standards manage the temperature rise that occurs when the hydrogen gas enters into the vehicle. For example, a hydrogen gas delivery system, such as a hydrogen gas station, may pre-cool the hydrogen gas prior to delivery to the fuel cell vehicle. Thus, when the pre-cooled hydrogen gas subsequently expands and heats up, the hydrogen gas does not exceed a temperature threshold, which would result in damage to the fuel tank.

Different fuel tanks, however, have different temperature thresholds at which damage would result. For example, a fuel tank lined with a plastic tank liner, has a lower temperature threshold than a fuel tank lined with an aluminum tank liner or made of an aluminum material. Thus, the hydrogen gas station has to pre-cool the hydrogen gas to an even lower temperature. In order to pre-cool the hydrogen gas, the hydrogen gas station uses a significant amount of energy to cool the hydrogen gas.

Accordingly, there is a need for systems and methods to automatically active cooling within the vehicle to minimize, reduce or otherwise limit the amount of pre-cooling needed to reduce costs and allow for different materials to be used as the fuel tank liner within the vehicle.

SUMMARY

In general, one aspect of the subject matter described in this specification may be embodied in an active fuel cooling system ("fuel cooling system"). The fuel cooling system 100 includes a fuel tank configured to store fuel. The fuel cooling system includes one or more pipes positioned adjacent to, in contact with, or within the fuel tank. The one or more pipes are configured to deliver refrigerant that cools the fuel tank. The fuel cooling system includes a compressor for pumping the refrigerant through the one or more pipes to cool the fuel stored within the fuel tank. The fuel cooling system includes an electronic control unit connected to the compressor and configured to operate the compressor to pump the refrigerant through the one or more pipes to cool the fuel stored in the fuel tank.

These and other embodiments may optionally include one or more of the following features. The fuel cooling system may include a first sensor. The first sensor may be configured to measure or detect a temperature within the fuel tank or a temperature of the fuel. The electronic control unit may be configured to obtain, from the first sensor, the temperature within the fuel tank or the temperature of the fuel. The electronic control unit may determine a speed to operate the compressor pump based on the temperature within the fuel tank or the temperature of the fuel. The electronic control unit may be configured to operate the compressor at the determined speed.

The fuel cooling system may include a second sensor configured to determine a mass flow rate of a gas flowing into the fuel tank. The electronic control unit may be configured to determine the speed to operate the compressor pump further based on the mass flow rate of the gas flowing into the fuel tank. The fuel tank may include multiple fuel tanks. The one or more pipes may include multiple pipes. The multiple pipes may be positioned within multiple interstitial spaces among the multiple fuel tanks. The multiple fuel tanks may be arranged in layers and the multiple pipes may be connected in parallel to each other.

The fuel cooling system may include a communication device for communicating with an external pump that provides the fuel. The electronic control unit may be configured to obtain a mass flow rate of the fuel flowing or entering into the fuel tank from the external pump. The electronic control unit may be configured to control an amount of flow of the refrigerant into the one or more pipes that are positioned adjacent to, in contact with, or within the fuel tank to cool the fuel. The fuel cooling system may include a bypass valve or a switch that diverts and controls the amount of flow of the refrigerant from a pipe that delivers the refrigerant to an evaporator to the one or more pipes that are positioned adjacent to, in contact with, or within the fuel tank to cool the fuel. The electronic control unit may be configured to move the bypass valve or the switch into an open, a closed, a partially open, or a partially closed position.

In another aspect, the subject matter may be embodied in a method for heat exchange between a fuel tank and a heat transfer medium. The method includes obtaining, by a processor, a temperature within the fuel tank. The method includes determining, by the processor, a speed of a compressor or a blower that pumps or blows the heat transfer medium based on the temperature within the fuel tank. The method includes controlling, using the processor, the compressor or the blower to pump or blow the heat transfer medium in proximity to the fuel tank based on the speed of the compressor or the blower.

In another aspect, the subject matter may be embodied in a fuel cooling system. The fuel cooling system includes multiple fuel tanks configured to store a gaseous fuel. The fuel cooling system includes a fuel cooling matrix that is positioned adjacent to, in contact with, or within the plurality of fuel tanks and is configured to cool the gaseous fuel stored within the plurality of fuel tanks. The fuel cooling system includes at least one of a compressor for pumping a refrigerant or a blower for moving air through the fuel cooling matrix. The fuel cooling system includes an electronic control unit connected to the at least one of the compressor or the blower. The electronic control unit may be configured to determine a speed of the at least one of the compressor or the blower. The electronic control unit may be configured to control the at least one of the compressor or the blower based on the determined speed.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Figure 1:
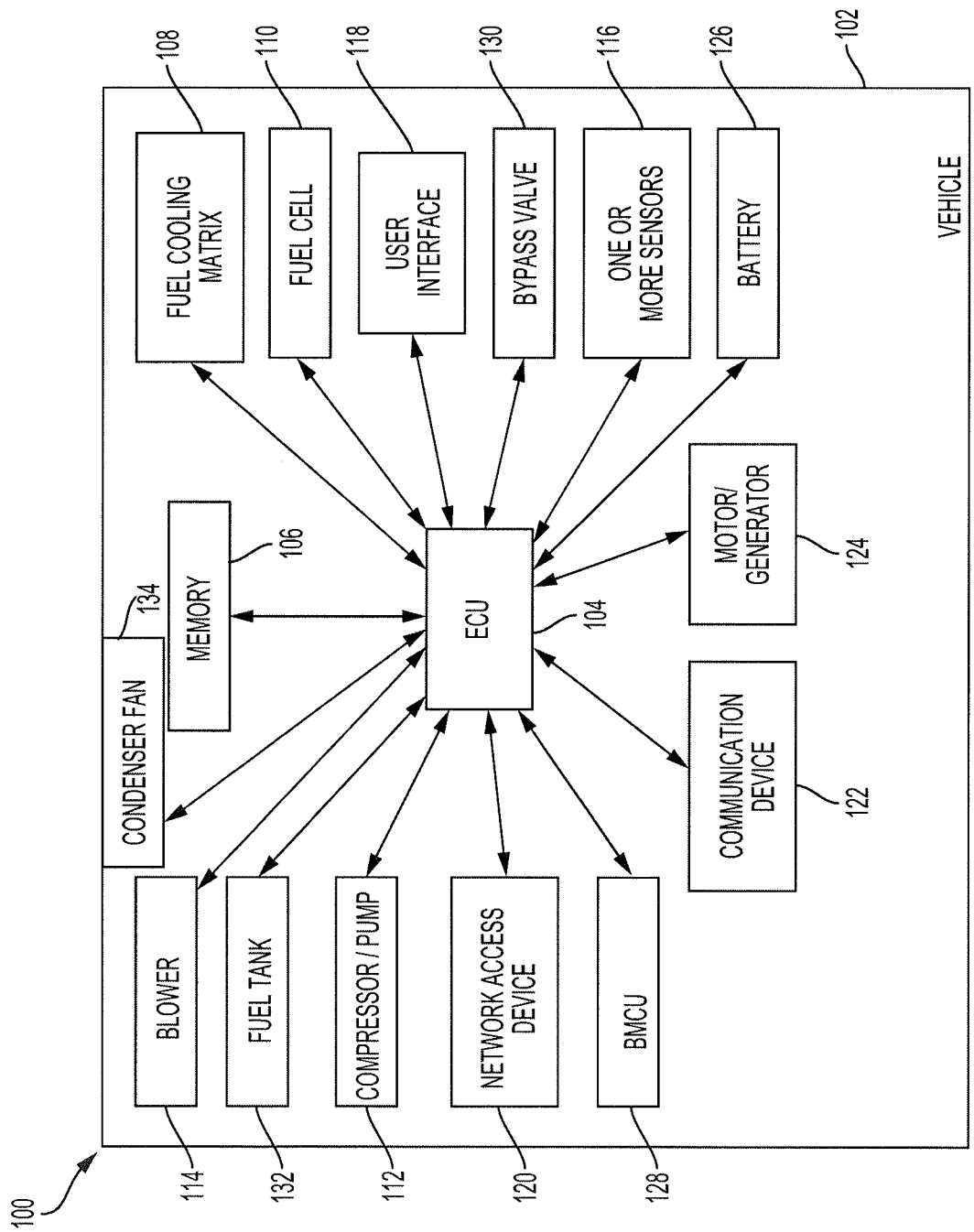
FIG. 1 is a block diagram of an example active fuel cooling system according to an aspect of the invention.

Disclosed herein are systems, devices, apparatuses and methods for controlling, managing, automatically and/or actively cooling the temperature of the fuel tank walls in an electric vehicle. Particular embodiments of the subject matter described in this specification may be implemented to realize one or more of the following advantages. The active fuel cooling system ("fuel cooling system") manages or controls various components and flow or pump rates of the various components to manage or automatically control the temperature within the fuel tank when fuel is being pumped or stored within the fuel tanks. By actively cooling the inside of the fuel tank or the walls of the fuel tank, the fuel cooling system reduces the need for pre-cooling the fuel prior to delivery, and thus, reduces the amount of energy used by the fuel delivery system, such as the fuel station, to pre-cool the fuel. Since the fuel cooling system reduces the amount of energy used by the fuel delivery system to pre-cool the fuel, the fuel delivery system may charge less for the fuel. Additionally, the active fuel cooling system advantageously allows the temperature of the fuel within the fuel tank to be regulated and maintained at a specific temperature or within a specified temperature range.

Moreover, since the fuel no longer needs to be pre-cooled, ambient stations or other ambient delivery systems may be used to deliver the fuel to the vehicle. This allows for additional flexibility in the type, location and other conditions necessary for the fuel delivery system. For example, an ambient delivery system may installed within a home.

Other benefits and advantages include a reduction in the amount of time necessary to fuel the vehicle. As the rate of flow of fuel into the fuel tank from the fuel station increases, the temperature within the fuel tank increases. Since the fuel cooling system actively cools the fuel tanks, the fuel cooling system allows for the fuel station, whether the fuel station is an ambient fuel delivery system or a pre-cooling fuel delivery system, to deliver the fuel to the vehicle faster. Thus, the fuel cooling system reduces the amount of time necessary to fuel the vehicle, which allows a driver to refuel the vehicle faster and spend less time at the fuel station, because the cooling requirements are offloaded to the vehicle.

Additionally, since the cooling requirements are offloaded to the vehicle, the fuel cooling system prevents nozzle freeze because the hydrogen may be stored at ambient or warmer temperatures at the fuel delivery system. Moreover, the fuel delivery system is less expensive because there is no need for pre-cooling devices or equipment.

Additionally, by actively cooling the inside of the fuel tank or the walls of the fuel tank, the fuel cooling system allows the fuel tank to utilize materials that are more lightweight, such as plastics or polyethylene, which have a lower temperature threshold than aluminum. The use of the lightweight materials reduces the overall vehicle weight, which improves fuel efficiency. Active cooling also allows the fuel cooling system to optimize the fuel mass flow rate based on the material of the liner of the fuel tanks of the vehicle.

Moreover, waste heat from the heating, ventilation and air conditioning unit may be recirculated around the fuel tank or the walls of the fuel tank, while driving and consuming hydrogen, to reduce the amount of thermal cycling of the fuel tank, which results from a cooling effect when the hydrogen fuel is consumed. By decreasing the amount of thermal cycling, the fuel cooling system increases the lifespan of the fuel tank and increases the efficiency of the radiator.

Figure 2:
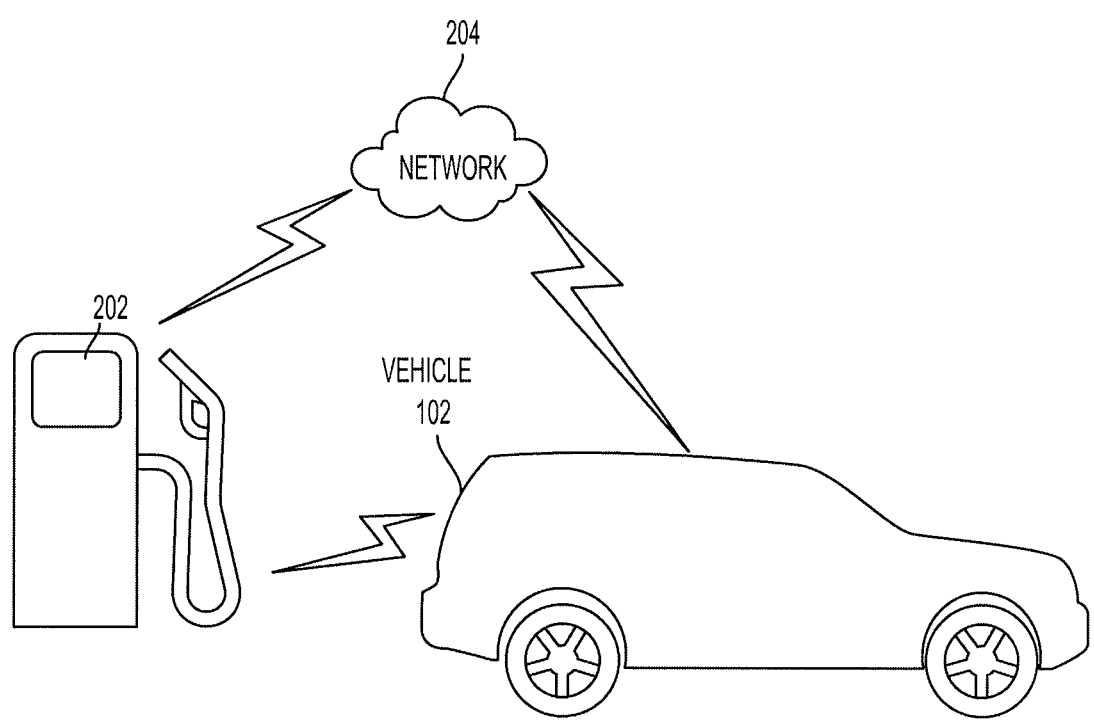
FIG. 2 shows the active fuel cooling system of FIG. 1 interacting with a fuel delivery system according to an aspect of the invention.

FIG. 1 is a block diagram of an active fuel cooling system ("fuel cooling system") 100. The fuel cooling system 100 may interact with the fuel delivery system, such as a fuel station 202, as shown in FIG. 2. The fuel cooling system 100 may be installed, included, part-of, or retrofitted within a vehicle 102 to manage or control the temperature of the fuel within the fuel tank and/or fuel when the fuel tank is being filled with fuel. The fuel cooling system 100 may measure a temperature of the fuel tank, and/or the fuel within the fuel tank and pump or move a heat exchange medium, such as a refrigerant, water or air, into proximity of the fuel tank to cool the fuel tank. This allows the fuel delivery system to increase the flow of the fuel into the vehicle and avoid the need to pre-cool the fuel prior to delivery to the vehicle 102.

A vehicle, e.g., vehicle 102, is a conveyance capable of transporting a person or persons or any material or any permanently or temporarily affixed apparatus. The vehicle may be a self-propelled wheeled conveyance, such as a car, a truck, a bus, a van or other motor and/or battery driven vehicle. For example, the vehicle 102 may be an electric vehicle, such as a hydrogen powered electric vehicle, a hybrid vehicle, or a plug-in hybrid vehicle. Other examples of vehicles include bicycles, trains, planes, or boats, and any other form of conveyance that is capable of transportation. The vehicle may be a semi-autonomous or an autonomous vehicle. That is, the vehicle 102 may be self-maneuvering and capable of sensing the environment and navigating without human input.

The fuel cooling system 100 includes a processor, such as an electronic control unit 104, a memory 106, a fuel cooling matrix 108, a fuel cell 110 and at least one of a compressor 112 or a standard pump when coolant is used instead of the refrigerant, a compressor fan 134 or a blower 114. The fuel cooling system 100 may include one or more sensors 116, a user interface 118 and/or a bypass valve 130. The fuel cooling system 100 and/or the vehicle 102 may include other components, such as a network access device 120, a communication device 122, a motor and/or generator 124, a battery 126, a battery management control unit (BMCU) 128 and/or a fuel tank 132.

The fuel cooling system 100 includes a processor, such as the electronic control unit (ECU) 104, that is programmed to control the rotation speed of the blower 114 and/or the rotation speed of the motor of the compressor 112. The ECU 104 controls the speed of the blower 114 and/or the speed of the compressor 112 to adjust or manages the heat exchange medium rate or amount into the fuel cooling matrix 108 to control and/or manage the temperature within the one or more fuel tanks 132. The heat exchange medium may be air, e.g., blown by the blower 114, water or refrigerant, e.g., pumped by the compressor 112. The ECU 104 may control a position of a bypass valve 130 to divert a heat exchange medium from an interconnected system, such as the heating, ventilation and air conditioning (HVAC) system, into the fuel cooling matrix 108 to cool and/or manage the temperature of the fuel tank 132 and/or the fuel within the fuel tank 132.

The ECU 104 may be coupled to the memory 106. The memory 106 may store instructions to execute on the ECU 104 and may include one or more of a random access memory (RAM) or other volatile or non-volatile memory. The memory 106 may be a non-transitory memory or a data storage device, such as a hard disk drive, a solid-state disk drive, a hybrid disk drive, or other appropriate data storage. The memory 106 may further store machine-readable instructions, which may be loaded and executed by the ECU 104 to control and/or manage the temperature of the fuel tank 132 and/or the fuel within the fuel tank 132.

The fuel cooling system 100 includes at least one of a compressor 112, a condenser fan 134 or a blower 114. The compressor 112 may be an Air Conditioning (A/C) compressor used within the HVAC system or may be a separate compressor or pump. The compressor 112 transports a heat exchange medium, such as refrigerant, water or other liquid, through the pipes of a fuel cooling matrix 108 to cool the one or more fuel tanks 132. The ECU 104 may be coupled to a motor of the compressor 112 and control, adjust or otherwise manage the rotation speed of the motor of the compressor 112 to control the flow rate of the refrigerant, for example. The ECU 104 may control the blower 114, impeller or fan to blow or move a heat exchange medium, such as air, across the one or more fuel tanks 132 through the fuel cooling matrix 108 to cool the one or more fuel tanks 132, for example. In another example, the ECU 104 may control the speed of the condenser fan 134 to extract and release heat from the refrigerant.

The fuel cooling system 100 may include a bypass valve 130. When the fuel cooling system 100 is connected to the HVAC system and utilizes the same refrigerant flow, the fuel cooling system 100 uses the bypass valve 130 to direct or divert refrigerant flowing to the evaporator from the compressor 112 via the receiver and expansion valve. The bypass valve 130 directs or diverts the refrigerant flow into the fuel cooling matrix 108 to cool the one or more fuel tanks 132. For example, the fuel cooling system 100 may use the bypass valve 130 to divert refrigerant from a pipe that leads to the evaporator of the HVAC system to one or more pipes into the fuel cooling matrix 108. The bypass valve 130 may have an open position, a closed position, a partially open, and/or a partially closed position. The ECU 104 may be coupled to the bypass valve 130 and control an actuator that moves the bypass valve 130 into various positions. This dual-use of the refrigerant reduces the number of components within the vehicle 102 and saves space within the vehicle 102 and cost.

Figure 3:
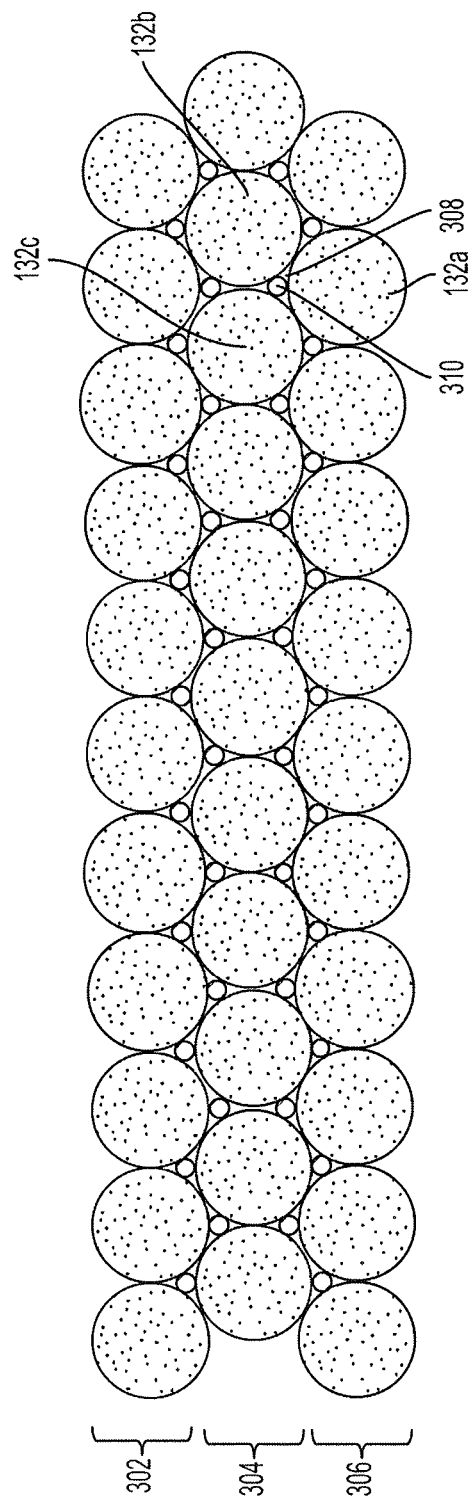
FIG. 3 shows an example arrangement of pressurized fuel gas tanks arranged in a hexagonal fuel cooling matrix and using refrigerant to cool the pressurized fuel gas tanks according to an aspect of the invention.

The fuel cooling system 100 includes a fuel cooling matrix 108. The fuel cooling matrix 108 may be positioned within, integrated with, connected to or surrounding the one or more fuel tanks 132. The one or more fuel tanks 132 store fuel, such as hydrogen, that is used by the fuel cell 110 to generate electrical energy that powers the vehicle 102. The one or more fuel tanks 132 may include multiple fuel tanks 132. The multiple fuel tanks 132 may be arranged in one or more layers, as shown in FIG. 3, for example. The fuel cooling matrix 108 may have one or more pipes that surround or are positioned around the one or more fuel tanks 132. For example, the one or more pipes may be positioned within interstitial spaces between the multiple layers of the multiple fuel tanks 132. FIG. 3 shows the positioning of the fuel cooling matrix 108 within multiple layers of the multiple fuel tanks 132. The fuel cooling matrix 108 may deliver the heat exchange medium into proximity of the one or more fuel tanks 132 to cool the one or more fuel tanks 132. The one or more fuel tanks 132 feed the fuel, such as hydrogen, into the fuel cell 110.

The fuel cooling system 100 includes a fuel cell 110. The fuel cooling system 100 passes air and fuel from the one or more fuel tanks 132 into the fuel cell 110. The air reacts with the fuel to generate electricity and water. The fuel cooling system 100 emits the water vapor and heat through the exhaust. The fuel cooling system 100 provides the electrical power to a motor and/or generator 124 to move the vehicle 102.

The motor and/or generator 124 may convert the electrical energy from the fuel cell 110 into mechanical power, such as torque, and may convert mechanical power into electrical energy. The motor and/or generator 124 may be coupled to the battery 126. The motor and/or generator 124 may convert the energy from the battery 126 into mechanical power, and may provide energy back to the battery 126, for example, via regenerative braking.

The battery 126 may be coupled to the motor and/or generator 124 and may provide electrical energy to and receive electrical energy from the motor and/or generator 124. The battery 126 may include one or more rechargeable batteries.

The BMCU 128 may be coupled to the battery 126, and may control and manage the charging and discharging of the battery 126. The BMCU 128, for example, may measure, using battery sensors, parameters used to determine the state of charge (SOC) of the battery 126.

The fuel cooling system 100 may include one or more sensors 116. The ECU 104 may be coupled to one or more sensors 116 that detect various parameters. For example, a temperature sensor may detect and/or measure the temperature of the one or more fuel tanks 132, the temperature within the one or more fuel tank 132 and/or the temperature of the fuel within the one or more fuel tank 132. In another example, a tank pressure sensor may detect and/or measure the pressure and calculate the mass flow rate of the fuel flowing into the one or more fuel tanks 132 from the fuel delivery system. In another example, a flow rate sensor may detect and/or measure the flow rate of the heat exchange medium, such as a refrigerant or water, into the fuel cooling matrix 108. In another example, a speed sensor may measure and/or detect the speed of the compressor 112 and/or the speed of the blower 114. In another example, a proximity sensor may detect a distance between the vehicle 102 and the fuel station 202.

The fuel cooling system 100 may include a user interface 118. The user interface 118 may be a vehicle display or a personal device, e.g., a mobile phone, a tablet, a personal computer, that is connected to the ECU 104 through the network access device 120 across a network. The user interface 118 may include any device capable of receiving user input, such as a button, a dial, a microphone, or a touch screen, and any device capable of output, such as a display, a speaker, or a refreshable braille display. The user interface 118 allows a driver or a passenger of the vehicle 102 to communicate with the ECU 104. For example, the driver may be able to provide data to the ECU 104 and/or receive feedback from the ECU 104 via the user interface 118.

The fuel cooling system 100 may include a network access device 120. The network access device 120 may include a communication port or a channel, such as one or more of a Wi-Fi unit, a Bluetooth® unit, a radio frequency identification (RFID) tag or reader, or a cellular network unit for accessing a cellular network (such as 3G, 4G or 5G). The network access device 120 may transmit data to and receive data from devices and systems not directly connected to the vehicle 102. For example, the ECU 104 may communicate with the fuel station 202 over a network 204, as shown in FIG. 2, for example.

The communication device 122 may include vehicle-to-infrastructure (V2I) communication that communicates with the fuel delivery infrastructure, such as the fuel station 202. The communication device 122 may communicate directly with the fuel station 202 or through the network 204.

FIG. 2 shows the fuel cooling system 100 interacting and/or communicating with a fuel delivery system, such as a fuel station 202. The fuel cooling system 100 may communicate with the fuel station 202 via a wired or a wireless connection. The fuel cooling system 100 may use a network access device 120 to communicate with the fuel station 202, such as a hydrogen fuel station, via the network 204. The network 204, such as a local area network (LAN), a wide area network (WAN), a cellular network, the Internet, or a combination thereof, may connect the vehicle 102 and/or the fuel cooling system 100 to the fuel station 202. The fuel cooling system 100 may obtain information including the initial temperature of the fuel and/or the rate or amount of fuel being dispensed and/or entering into the fuel tank 132. In some implementations, the fuel cooling system 100 communicates directly with the fuel station 202. The fuel cooling system 100 may use a communication device 122, such as a vehicle-to-infrastructure (V2I) device, that may use a dedicated short range communication (DSRC) frequency to transfer data, to communicate directly with the fuel station 202. In some implementations, the fuel control system 100 may communicate with the fuel station 202 to control the mass flow rate of the fuel, such as increase or decrease the mass flow rate, into the fuel tanks 132. In some implementations, the fuel cooling system 100 communicates with the fuel station 202 through the fueling nozzle via an infrared transceiver near the receptacle.

FIG. 3 shows an arrangement of pressurized fuel tanks 132 arranged in a fuel cooling matrix 108, such as a hexagonal fuel cooling matrix. The fuel tanks 132 may include multiple fuel tanks 132 that are connected in parallel or series. The fuel tanks 132 may be arranged in any number of configurations, such as multiple layers 302, 304, 306, for example. Each layer of the multiple layers 302, 304, 306 may be offset from an adjacent layer. By offsetting each layer, the fuel tanks 132 are arranged to form one or more interstitial spaces 308 ("interstitial space") among two or more surrounding fuel tanks 132. For example, an interstitial space 308 may be formed between the fuel tanks 132a-c. The fuel cooling system 100 may deliver a heat exchange medium through the one or more interstitial spaces 308 of the fuel cooling matrix 108 to cool the walls of the fuel tanks 132 and/or the fuel within the fuel tanks 132.

The fuel cooling system 100 may have one or more heat exchange medium passageways (or "coolant tubes") 310 positioned within the one or more interstitial spaces 308. The one or more coolant tubes 310 may be positioned adjacent to and/or in contact with the one or more fuel tanks 132. The fuel cooling system 100 may use the compressor 112 to pump a heat exchange medium, such as a refrigerant or water, through the one or more coolant tubes 310 to draw heat from the exterior walls of the fuel tanks 132. The amount of heat drawn from the exterior walls of the fuel tanks 132 may be directly proportional to the rate of flow of the heat exchange medium through the one or more coolant tubes 310 and the amount of surface area of the one or more coolant tubes 310 in contact with and/or adjacent to the exterior walls of the fuel tanks 132. That is, as the amount of surface area of the one or more coolant tubes 310 that is in contact with and/or adjacent to the exterior walls of the fuel tanks 132 and/or the rate of flow of the heat exchange fluid within the one or more coolant tubes 310 increases, the rate and/or amount heat drawn from the fuel tanks 132 increases. As the amount of surface area of the one or more coolant tubes 310 that is in contact with the exterior walls of the fuel tanks 312 and/or the rate of flow of the heat exchange fluid within the one or more coolant tubes 310 decreases, the rate and/or amount of the heat drawn from the fuel tanks 132 decreases. The fuel cooling system 100 may be an independent system from other vehicle systems or may be integrated with and/or interconnected with another vehicle system, such as the heating, ventilation and air conditioning system of the vehicle 102.

Figure 4:
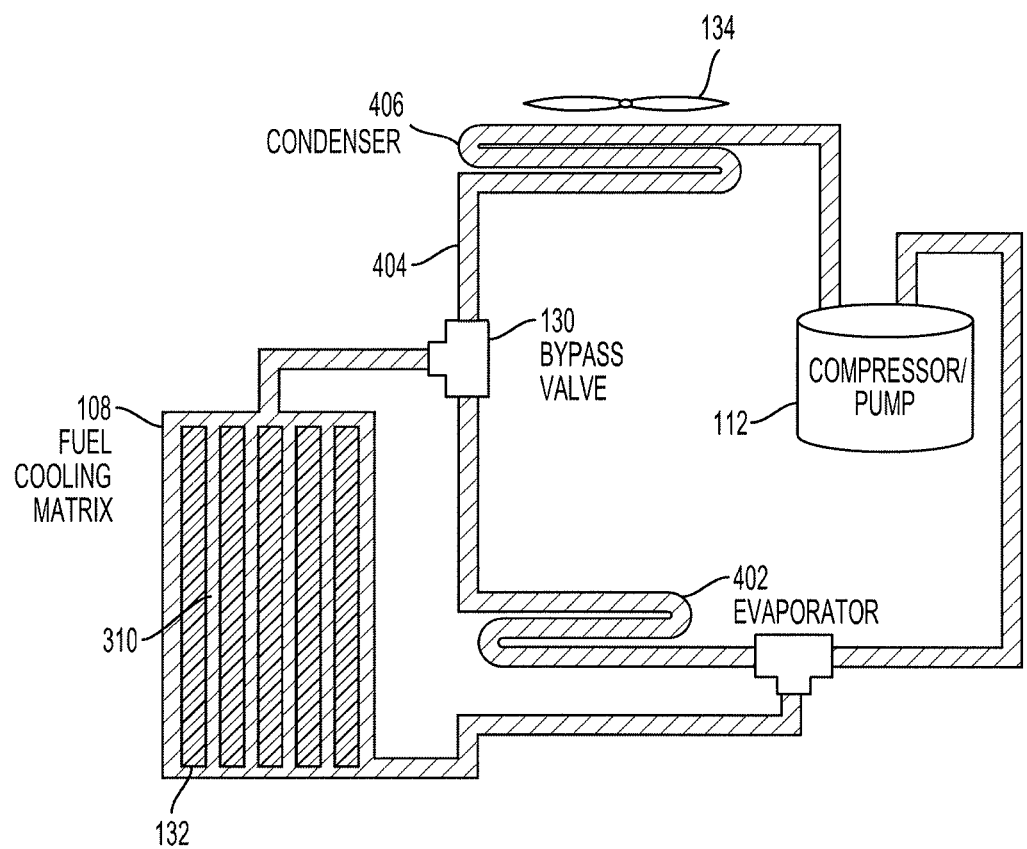
FIG. 4 shows the fuel cooling matrix interconnected with the heating, ventilation and air conditioning system of a vehicle according to an aspect of the invention.

In some implementations, the one or more coolant tubes 310 may be connected to and/or integrated with one or more pipes within a heating, ventilation and air conditioning (HVAC) system, as shown in FIG. 4, for example. The fuel cooling system 100 may have a bypass valve 130 that controls and/or redirects refrigerant from the evaporator of the HVAC system to the fuel cooling matrix 108. FIG. 4 further describes the integration of the fuel cooling matrix 108 with the HVAC system.

Figure 5:
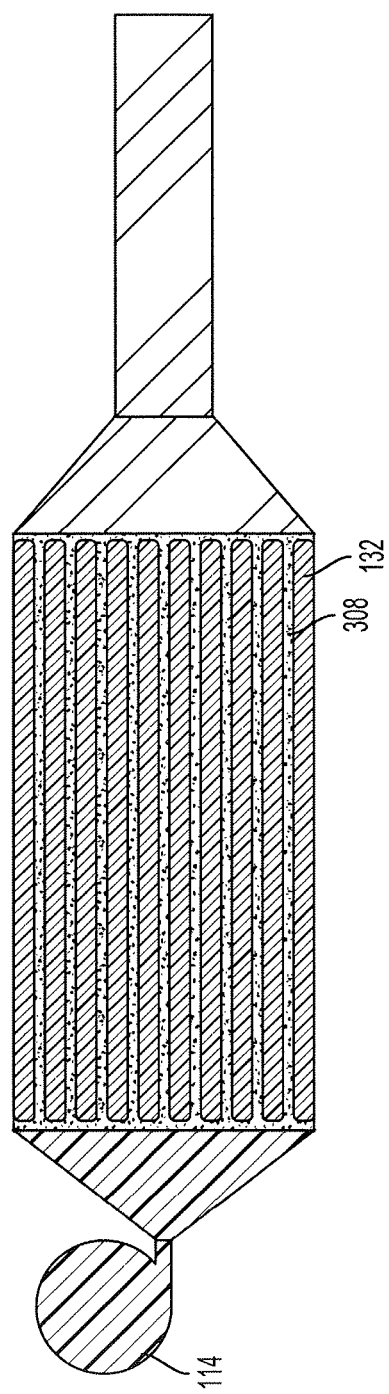
FIG. 5 shows an example fuel cooling matrix utilizing air to cool the pressurized fuel gas tanks according to an aspect of the invention.

In some implementations, the fuel cooling system 100 may use a manifold or blower 114 to push or flow air through the fuel cooling matrix 108 to cool the walls of the fuel tanks 132, as shown in FIG. 5, for example. The amount of heat drawn from the exterior walls of the fuel tanks 132 may be directly proportional to the rate of flow of the air through the one or more interstitial spaces 308 and/or the amount of surface area of the exterior walls of the fuel tanks 132 exposed to the one or more interstitial spaces 308. That is, as the amount of surface area of the exterior walls of the fuel tanks 132 that are exposed within the one or more interstitial spaces 308 and/or the rate of flow of the air within the one or more interstitial spaces 308 increases, the rate and/or amount of heat drawn from the fuel tanks 132 increases. As the amount of surface area of the exterior walls of the fuel tanks 132 that are exposed within the one or more interstitial spaces 308 and/or the rate of flow of the air within the one or more interstitial spaces 308 decreases, the rate and/or amount of heat drawn from the fuel tanks 132 decreases.

FIG. 4 shows the fuel cooling matrix 108 utilizing a refrigerant as the heat exchange medium to cool the pressurized fuel tank 132 when the fuel is filling the fuel tank 132. The fuel cooling matrix 108 may be interconnected with one or more pipes 404 of the HVAC system of the vehicle 102. One or more coolant tubes 310 may be connected to the one or more pipes 404 of the HVAC system. The fuel cooling system 100 may have one or more bypass valves 130 that interconnect the one or more coolant tubes 310 before the refrigerant enters the evaporator 402 to direct a portion of the refrigerant to the fuel cooling matrix 108 and bypass the evaporator 402. The bypass valve 130 may have an actuator that controls the position of the bypass valve 130 and positions the bypass valve 130 in an open, a close, a partially open, and/or a partially closed position. After the refrigerant exits the fuel cooling matrix 108, one or more coolant tubes 310 connected to the fuel cooling matrix 108 lead the warmed refrigerant back to one or more pipes 404 of the HVAC system of the vehicle 102. The condenser 406 using the condenser fan 134 may release the heat that was absorbed within the refrigerant. The refrigerant enters the condenser 406 as a high-pressure vapor, but as it flows through the condenser 406 and cools, the refrigerant turns back into a cooler high-pressure liquid. The fuel cooling system 100 may adjust the speed of the condenser fan 134 to adjust the amount or rate of cooling of the refrigerant.

When the vehicle 102 is using the fuel in the fuel tank 132, the fuel cooling system 100 may use the fuel cooling matrix 108 to cool the refrigerant. As the fuel exits the fuel tank 132 and is used by the vehicle 102 to power the vehicle 102, the one or more fuel tanks 132 decrease in temperature and/or cool. As the fuel tanks 132 decrease in temperature and/or cool, the one or more fuel tanks 132 may cool the refrigerant. The cooled refrigerant may be passed back to the compressor 112. Since the refrigerant requires less energy to be cooled, the HVAC system may require less energy to cool the refrigerant, and thus, energy efficiency is increased. In some implementations, the fuel cooling system 100 may direct the cooled refrigerant to one or more pipes in proximity to the battery 126 and/or the fuel cell 110. This may cool the battery 126 and/or the fuel cell 110 so that the battery 126 and/or the fuel cell 110 may operate more efficiently.

FIG. 5 shows the fuel cooling matrix 108 utilizing air as the heat exchange medium to cool the pressurized fuel tank. The fuel cooling matrix 108 may use a manifold or blower 114 to blow air through the fuel cooling matrix 108 to cool the fuel tank. The blower 114 may blow the air through the one or more interstitial spaces 308 among the adjacent fuel tanks 132.

Figure 6:
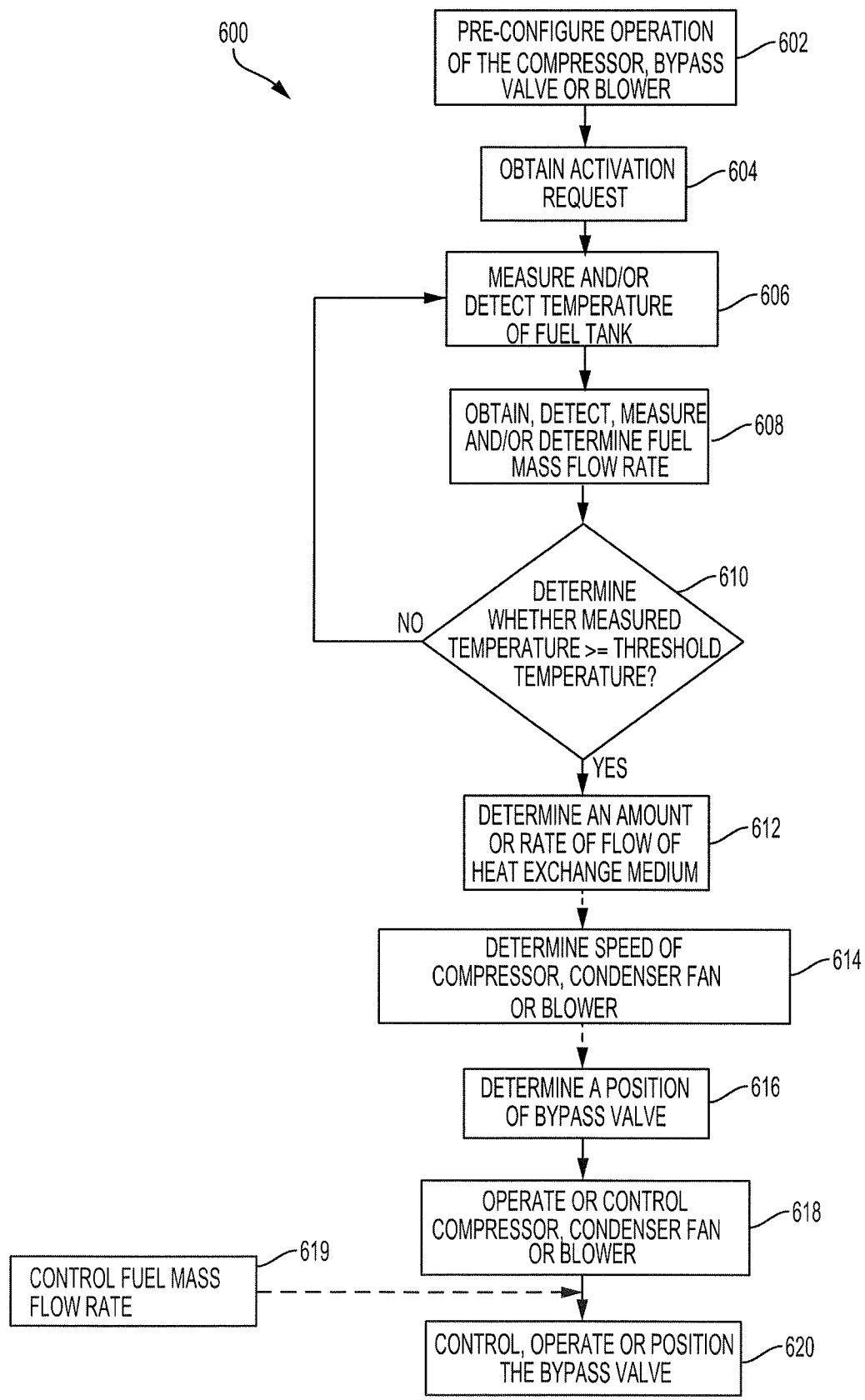
FIG. 6 is a flow diagram of an example process for controlling and/or adjusting the speed of the motor of the compressor, the speed of the blower to cool the fuel tank and/or the position of the bypass valve using the active fuel cooling system of FIG. 1 according to an aspect of the invention.

FIG. 6 describes the process for controlling and/or adjusting the speed of the motor of the compressor 112, the speed of the blower 114 and/or the position of the bypass valve 130 to cool the fuel tank 132. One or more computers or one or more data processing apparatuses, for example, the ECU 104 of the fuel cooling system 100 of FIG. 1, appropriately programmed, may implement the process 600.

The fuel cooling system 100 is pre-configured to operate the compressor 112 or the blower 114 based on the implementation, design and components of the vehicle 102 (602). For example, the fuel cooling system 100 may be designed with an integrated fuel cooling matrix 108 that utilizes the refrigerant from the HVAC system, as shown in FIG. 4, for example, and so, the fuel cooling system 100 controls the bypass valve 130 and/or the compressor 112 to control the temperature of the fuel and/or the fuel tank 132. In another example, the fuel cooling system 100 may be designed with the fuel cooling matrix 108 that uses air to cool the fuel tanks 132, as shown in FIG. 5, for example, and so, the fuel cooling system 100 may control the blower 114 to control the temperature of the fuel or the fuel tank 132.

The fuel cooling system 100 may obtain an activation request that triggers cooling of the one or more fuel tanks 132 (604). The fuel cooling system 100 uses one or more sensors 116 to determine a distance between the vehicle 102 and a fuel station 202, and if the distance is less than a threshold distance, the fuel cooling system 100 may activate. In some implementations, the fuel cooling system 100 may receive an activation request from the fuel station 202 via the communication device 122 or the network access device 120, when the detected distance to the vehicle 102 is less than the threshold distance, for example. In some implementations, the fuel cooling system 100 may use one or more sensors 116 to detect that fuel from the fuel station 202 is entering the one or more fuel tanks 132 or that a nozzle of the fuel station 202 has been inserted into a gas hole or opening that leads to the one or more fuel tanks 132, which activates the fuel cooling system 100.

The fuel cooling system 100 measures and/or detects a temperature of the fuel tank 132 and/or the fuel within the fuel tank 132 (606). The fuel cooling system 100 may use one or more sensors 116 positioned on a wall of the fuel tank 132 or within the fuel tank 132 to measure and/or detect the temperature of the fuel tank 132 and/or the fuel.

The fuel cooling system 100 obtains, determines, detects and/or measures the fuel mass flow rate into the fuel tank 132 (608). The fuel cooling system 100 may use one or more sensors 116 to detect, measure or calculate the mass flow rate of the fuel that enters into the fuel tank 132. The one or more sensors 116 may be positioned within a pipe that leads from the gas hole to the fuel tank 132 or near an opening that leads into the fuel tank 132. For example, the one or more sensors 116 may measure or detect a pressure, and the ECU 104 may calculate the mass flow rate based on the pressure, the volume of the fuel tank and the temperature. In some implementations, the fuel cooling system 100 may obtain the fuel mass flow rate from the fuel station 202. The fuel cooling system 100 may establish communication with the fuel station 202 and receive information that indicates to the vehicle 102 the fuel mass flow rate. The fuel cooling system 100 may establish the communication across the network 204 using the network access device 120 and/or directly using the communication device 122, as shown in FIG. 2, for example.

The fuel cooling system 100 may determine whether the measured and/or detected temperature is greater than or equal to a threshold temperature (610). The fuel cooling system 100 may compare the measured and/or detected temperature to the threshold temperature and determine whether to use a heat exchange medium to cool the fuel within the fuel tank 132 or continue to continuously or periodically monitor the temperature (e.g., every 30 seconds, every 1 minute, etc.). The threshold temperature may be a temperature at which the liner of the fuel tank 132 is damaged with or without a safety margin, for example. For example, if the line of the fuel tank 132 is able withstand a temperature of 90 degrees Fahrenheit (° F.), the threshold temperature may be 85° F. to allow for a safety margin of 5° F. This prevents the fuel from reaching a temperature that would damage the fuel tank liner. The threshold temperature may be pre-configured or pre-set at the factory or using the ECU 104.

In some implementations, the fuel cooling system 100 does not compare the measured and/or detected temperature with the threshold temperature. Instead, the fuel cooling system 100 maintains a constant or continuous flow of the heat exchange medium to cool the fuel within the fuel tank 132 and determines the amount or rate of flow of the heat exchange medium through the fuel cooling matrix 108 to maintain the temperature within a temperature range.

If the measured and/or detected temperature is less than the threshold temperature, the fuel cooling system 100 continues to measure and/or detect the temperature. If the measured and/or detected temperature is greater than or equal to the threshold temperature, the fuel cooling system 100 may determine an amount or rate of flow of the heat exchange medium to provide through the fuel cooling matrix 108 to maintain the temperature of the fuel within the fuel tank 132 below the threshold temperature (612). The fuel cooling system 100 may calculate a difference between the measured and/or detected temperature and the threshold temperature to determine the amount or rate of the heat exchange medium needed to cool the fuel within the fuel tank 132. The amount or rate of the heat exchange medium needed may be based on the difference between the measured temperature and the threshold temperature, the type of heat exchange medium, the fuel mass flow rate, and/or the amount of surface area of the one or more fuel tanks 132 in proximity to one or more pipes containing the heat exchange medium.

The amount or rate of the heat exchange medium necessary to cool the fuel may be directly proportional to the difference between the measured temperature and the threshold temperature. As the difference increases, more of the heat exchange medium is necessary to cool the fuel, for example. Similarly, as the amount of surface area of the one or more fuel tanks 132 that is proximity or in contact with the heat exchange medium or one or more pipes containing the heat exchange medium increases, the rate at which heat exchange medium cools the fuel increases, and so, less heat exchange medium is necessary to cool the fuel.

Moreover, since the temperature of the fuel and/or the fuel tank 132 increases as the fuel mass flow rate into the vehicle 102 increases, a greater amount or rate of mass flow of the heat exchange medium is necessary to cool the fuel and/or fuel tank 132. Additionally, since a refrigerant is able to exchange more heat than water or air, less heat exchange medium is necessary when the fuel cooling system 100 uses refrigerant as the heat exchange medium than when the fuel cooling system 100 uses water or air. Air, on the other hand, may require the largest amount of or the highest rate of flow to cool the fuel and/or fuel tank 132.

Other factors, such as the positioning of the coolant tubes 310 relative to the one or more fuel tanks 132, the ambient temperature, the number of fuel tanks 132 and/or the thermal conductivity of the material of the walls of the fuel tank 132, may also influence the amount or rate of flow of the heat exchange medium that is necessary to cool the fuel and/or the fuel tank 132. For example, if the ambient temperature is high, more heat exchange medium may be necessary to cool the fuel and/or the fuel tank 132.

Once the amount or rate of flow of the heat exchange medium necessary to cool the fuel is determined to maintain the temperature of the fuel below the threshold temperature, the fuel cooling system 100 determines a speed of the compressor 112, a speed of the condenser fan 134 and/or a speed of the blower 114 based on the amount or rate of the heat exchange medium necessary to cool the fuel (614). The speed of the compressor 112 may be a rotation speed of the motor of the compressor 112 that pumps the refrigerant through the fuel cooling matrix 108, as shown in FIG. 4, for example. The speed of the compressor fan 134 affects the amount of heat released from the refrigerant and increases the overall cooling potential, as shown in FIG. 4, for example. The speed of the blower 114 may be a rotation speed of a fan, manifold or other impeller of the blower 114 that blows air through the fuel cooling matrix 108, as shown in FIG. 5, for example. The fuel cooling system 100 may use a mapping or a table to determine the speed of the compressor 112, the condenser fan 134 or the speed of the blower 114. For example, a range of amounts or rates of flow of the heat exchange medium may correspond to a speed or a range of speeds of the compressor 112, the compressor fan 134 or the blower 114.

The fuel cooling system 100 may determine a position of a bypass valve 130 or other switch to redirect the flow of the heat exchange medium from a pipe that delivers the heat exchange medium to an evaporator to one or more pipes of the fuel cooling matrix 108 (616). The position of the bypass valve 130 may be based on the speed of the compressor 112 and the determined amount or rate of flow of the heat exchange medium necessary to cool the fuel or the fuel tanks 132. The fuel cooling system 100 may determine an optimal position of the bypass valve 130 to minimize the speed of the compressor 112 necessary to maintain the temperature of the fuel or fuel tanks 132 below the threshold temperature. This may reduce an amount of energy used to power the compressor 112. In some implementations, the optimal position may be based on the amount of refrigerant necessary to cool both the fuel within the fuel tanks 132 and cool the air used in the evaporator 402 to cool the cabin of the vehicle 102 so that the cabin temperature is maintained at the user-desired temperature and the fuel temperature is maintained below the threshold temperature. This allows the fuel cooling system 100 to utilize the same heat exchange medium, such as the refrigerant, as the HVAC system of the vehicle 102, as shown in FIG. 4, for example.

The fuel cooling system 100 operates or controls the compressor 112, the condenser fan 134 or the blower 114 based on the determined speed for the compressor 112, the determined speed for the compressor fan 134 or the determined speed for the blower 114, respectively (618). For example, the fuel cooling system 100 uses the compressor 112 to pump the heat exchange medium, such as refrigerant or water, through one or more pipes of the fuel cooling matrix 108 at the determined speed. In another example, the fuel cooling system 100 uses the condenser fan 134 to increase the amount of heat extracted and released from the refrigerant. In another example, the fuel cooling system 100 uses the blower 114 to blow the heat exchange medium, such as air, through interstitial spaces of the fuel cooling matrix 108 among the one or more fuel tanks 132 based on the determined speed. This reduces the temperature of the fuel tanks 132 and/or the fuel within the fuel tanks 132 below the threshold temperature. Thus, faster fueling may take place and the amount of pre-cooling done by the fuel station may be reduced, while minimizing the risk of damage to the liner of the fuel tanks 132.

In some implementations, the fuel cooling system 100 may control the fuel mass flow rate of the fuel into the vehicle 102 (609). The fuel cooling system 100 may communicate with the fuel station 202 to control the mass flow rate of the fuel into the vehicle 102, when the fuel cooling system 100 is no longer able to increase the speed of the compressor 112 or the blower 114 due to hardware limitations, for example. The fuel cooling system 100 may reduce the fuel mass flow rate to reduce the amount of temperature increase resulting from the fuel entering the fuel tanks 132.

When the fuel cooling system 100 is interconnected with the HVAC system and utilizes the same heat exchange medium to cool the fuel tanks 132, as shown in FIG. 4, for example, the fuel cooling system 100 may control, operate, or otherwise position a bypass valve 130 to control or divert the refrigerant flow based on the determined position for the bypass valve (620). The fuel cooling system 100 may operate an actuator or a motor to move the bypass valve 130 to an open, a close, a partially open, or a partially closed position from an initial position. The bypass valve 130 redirects the flow of the heat exchange medium from one or more pipes of the HVAC system to one or more pipes that lead to the fuel cooling matrix 108 to cool the fuel tanks 132 based on the position of the bypass valve 130.

As the bypass valve 130 is opened, more of the heat exchange medium is redirected from the evaporator to the fuel cooling matrix 108. When the bypass valve is completely opened, the heat exchange medium flows entirely through the fuel cooling matrix 108 to cool the fuel tanks 132 and bypasses the evaporator. When the bypass valve is completely closed, the heat exchange medium flows entirely to the evaporator and through only the HVAC system. When the bypass valve is partially opened or partially closed, a portion of the heat exchange medium flows through the evaporator and another portion of the heat exchange medium flows through the fuel cooling matrix 108.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A fuel cooling system for a vehicle, comprising:
   a fuel tank configured to store fuel;
   one or more pipes positioned adjacent to or in contact with the fuel tank and configured to deliver refrigerant that cools the fuel tank;
   a compressor for pumping the refrigerant through the one or more pipes to cool the fuel stored within the fuel tank; and
   an electronic control unit connected to the compressor and configured to:
   operate the compressor to pump the refrigerant through the one or more pipes to cool the fuel stored in the fuel tank based on an amount of difference between a temperature within the fuel tank or a temperature of the fuel and a threshold temperature.

2. The fuel cooling system of claim 1, further comprising:
   a first sensor configured to measure or detect a temperature within the fuel tank or a temperature of the fuel;
   wherein the electronic control unit is configured to:
   obtain, from the first sensor, the temperature within the fuel tank or the temperature of the fuel;
   determine a speed to operate the compressor based on the temperature within the fuel tank or the temperature of the fuel; and
   operate the compressor at the determined speed.

3. The fuel cooling system of claim 2, further comprising:
   a second sensor configured to measure or detect a mass flow rate of the fuel entering into the fuel tank;
   wherein the electronic control unit is configured to determine the speed to operate the compressor further based on the mass flow rate of the fuel entering into the fuel tank.

4. The fuel cooling system of claim 1, wherein the fuel tank includes a plurality of fuel tanks, wherein the one or more pipes include a plurality of pipes, wherein the plurality of pipes are positioned within a plurality of interstitial spaces among the plurality of fuel tanks.

5. The fuel cooling system of claim 4, wherein the plurality of fuel tanks are arranged in layers and the plurality of pipes are connected in parallel to each other.

6. The fuel cooling system of claim 1, further comprising:
   a communication device for communicating with an external pump that provides the fuel;
   wherein the electronic control unit is configured to:
   obtain a speed of flow of the fuel entering into the fuel tank from the external pump.

7. The fuel cooling system of claim 1, wherein the electronic control unit is configured to:
   control an amount of flow of the refrigerant into the one or more pipes that are positioned in proximity to the fuel tank to cool the fuel.

8. The fuel cooling system of claim 7, further comprising:
   a bypass valve or switch that diverts and controls the amount of flow of the refrigerant to the one or more pipes that are positioned in proximity to the fuel tank to cool the fuel.

9. The fuel cooling system of claim 8, wherein to control the amount of flow of the refrigerant into the one or more pipes the electronic control unit is configured to:
   move the bypass valve or switch into an open, a close or a partially open position.

10. A fuel cooling system for a vehicle, comprising:
    a plurality of fuel tanks configured to store a gaseous fuel;
    a fuel cooling matrix that is positioned in proximity to the plurality of fuel tanks and is configured to cool the gaseous fuel stored within the plurality of fuel tanks;
    at least one of a compressor for pumping a refrigerant or a blower for moving air through the fuel cooling matrix; and
    an electronic control unit connected to the at least one of the compressor or the blower and configured to:
    determine a speed of the at least one of the compressor or the blower based on a mass flow rate of the gaseous fuel entering into the plurality of fuel tanks; and
    control the at least one of the compressor or the blower based on the determined speed when a temperature of the gaseous fuel is greater than or equal to a threshold temperature.

11. The fuel cooling system of claim 10, wherein the electronic control unit is configured to:
    obtain the temperature of the gaseous fuel; and
    control the at least one of the compressor or the blower based on the temperature of the gaseous fuel.

12. The fuel cooling system of claim 11, wherein to control the at least one of the compressor or the blower the electronic control unit is configured to:
    increase or decrease a speed of the at least one of the compressor or the blower based on the temperature of the gaseous fuel.

13. The fuel cooling system of claim 10, wherein the fuel cooling matrix includes a plurality of parallel pipes.

14. A fuel cooling system for a vehicle, comprising:
    a fuel tank configured to store fuel;
    one or more pipes positioned adjacent to or in contact with the fuel tank and configured to deliver refrigerant that cools the fuel tank;

a compressor for pumping the refrigerant through the one or more pipes to cool the fuel stored within the fuel tank; and an electronic control unit connected to the compressor and configured to:

determine an amount of difference between a temperature within the fuel tank or a temperature of the fuel and a threshold temperature, and operate the compressor to pump the refrigerant through the one or more pipes to cool the fuel stored in the fuel tank based on the amount of difference between the temperature within the fuel tank or the temperature of the fuel and the threshold temperature.

15. The fuel cooling system of claim 14, wherein the electronic control unit is configured to determine a speed of the compressor based on the temperature within the fuel tank or the temperature of the fuel.

16. The fuel cooling system of claim 15, wherein the electronic control unit is configured to operate the compressor to pump the refrigerant based on the determined speed.

17. The fuel cooling system of claim 15, further comprising:

a first sensor configured to measure or detect the temperature within the fuel tank or the temperature of the fuel.

18. The fuel cooling system of claim 15, wherein the electronic control unit is configured to:

control an amount of flow of the refrigerant into the one or more pipes that are positioned in proximity to the fuel tank to cool the fuel.

19. The fuel cooling system of claim 14, further comprising:

a bypass valve configured to direct or divert the refrigerant.

20. The fuel cooling system of claim 14, wherein the electronic control unit is configured to:

control the bypass valve to deliver the refrigerant from an evaporator to the one or more pipes in proximity to the fuel tank.

\* \* \* \* \*